US007243342B2

(12) United States Patent
Ghiya et al.

(10) Patent No.: US 7,243,342 B2
(45) Date of Patent: Jul. 10, 2007

(54) METHODS AND APPARATUS FOR DETERMINING IF A USER-DEFINED SOFTWARE FUNCTION IS A MEMORY ALLOCATION FUNCTION DURING COMPILE-TIME

(75) Inventors: Rakesh Ghiya, Santa Clara, CA (US); Daniel M. Lavery, Santa Clara, CA (US); David C. Sehr, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 486 days.

(21) Appl. No.: 10/167,206

(22) Filed: Jun. 11, 2002

(65) Prior Publication Data

US 2004/0078789 A1   Apr. 22, 2004

(51) Int. Cl.
*G06F 9/45* (2006.01)
*G06F 9/44* (2006.01)

(52) U.S. Cl. .............. 717/141; 717/148; 717/151; 711/1; 711/153; 711/171

(58) Field of Classification Search ........ 717/110–151; 714/48; 711/171, 153, 1; 707/103 R, 1; 710/104; 365/211
See application file for complete search history.

(56) References Cited

U.S. PATENT DOCUMENTS

| 5,142,681 | A |   | 8/1992 | Driscoll et al. |
| 5,287,511 | A | * | 2/1994 | Robinson et al. ........... 717/106 |
| 5,327,562 | A | * | 7/1994 | Adcock ....................... 717/141 |
| 5,437,037 | A | * | 7/1995 | Furuichi ...................... 717/146 |
| 5,448,737 | A |   | 9/1995 | Burke et al. |
| 5,524,244 | A | * | 6/1996 | Robinson et al. ........... 717/140 |
| 5,535,391 | A | * | 7/1996 | Hejlsberg et al. ........... 717/140 |
| 5,583,988 | A | * | 12/1996 | Crank et al. ................... 714/48 |
| 5,603,030 | A | * | 2/1997 | Gray et al. .................. 717/151 |
| 5,617,569 | A | * | 4/1997 | Gray et al. ............. 707/103 R |
| 5,657,447 | A | * | 8/1997 | Leung et al. ................... 707/1 |
| 5,671,431 | A | * | 9/1997 | Knopp ......................... 717/149 |
| 5,809,554 | A | * | 9/1998 | Benayon et al. ............. 711/171 |
| 5,828,883 | A | * | 10/1998 | Hall ............................ 717/133 |

(Continued)

OTHER PUBLICATIONS

Cidon et al., Optimal allocation of electronic content, IEEE, vol. 3, Apr. 22-26, 2001 pp. 1773-1780.*

(Continued)

*Primary Examiner*—Wei Zhen
*Assistant Examiner*—Satish S. Rampuria
(74) *Attorney, Agent, or Firm*—Hanley, Flight & Zimmerman, LLC

(57) ABSTRACT

Methods and apparatus are disclosed for determining if a user-defined software function is a memory allocation function during compile-time. The methods and apparatus determine if a user-defined function returns a new memory object every time the user-defined function is invoked. In addition, the methods and apparatus determine if the memory objects created by the user-defined function are available outside the scope of the user defined function. If the user-defined function returns a new memory object every time the user-defined function is invoked, and the memory objects created by the user-defined function are not available outside the scope of the user defined function, then the user-defined function is determined to be a memory allocation function. Otherwise, the user-defined function is determined to be a non-memory allocation function.

24 Claims, 3 Drawing Sheets

U.S. PATENT DOCUMENTS

| | | | |
|---|---|---|---|
| 5,864,862 A * | 1/1999 | Kriens et al. | 707/103 R |
| 6,058,460 A * | 5/2000 | Nakhimovsky | 711/153 |
| 6,141,712 A * | 10/2000 | Sudhakaran et al. | 710/104 |
| 6,154,823 A * | 11/2000 | Benayon et al. | 711/171 |
| 6,154,877 A * | 11/2000 | Ramkumar et al. | 717/114 |
| 6,212,673 B1 * | 4/2001 | House et al. | 717/100 |
| 6,246,405 B1 * | 6/2001 | Johnson | 715/764 |
| 6,253,368 B1 * | 6/2001 | Nelin et al. | 717/124 |
| 6,301,704 B1 | 10/2001 | Chow et al. | |
| 6,366,994 B1 * | 4/2002 | Kalyur | 711/173 |
| 6,427,234 B1 * | 7/2002 | Chambers et al. | 717/140 |
| 6,571,387 B1 | 5/2003 | Chow et al. | |
| 6,625,804 B1 * | 9/2003 | Ringseth et al. | 717/114 |
| 6,647,547 B1 * | 11/2003 | Kanamaru et al. | 717/151 |
| 6,721,943 B2 * | 4/2004 | Krishnaiyer et al. | 717/150 |
| 6,751,792 B1 | 6/2004 | Nair | |
| 6,829,190 B1 * | 12/2004 | Snyder et al. | 365/211 |
| 6,971,083 B1 * | 11/2005 | Farrugia et al. | 716/17 |
| 7,181,734 B2 * | 2/2007 | Swamy et al. | 717/144 |
| 2002/0056075 A1 * | 5/2002 | Hamilton et al. | 717/110 |
| 2002/0087949 A1 * | 7/2002 | Golender et al. | 717/124 |
| 2002/0129339 A1 * | 9/2002 | Callahan et al. | 717/127 |
| 2002/0144244 A1 * | 10/2002 | Krishnaiyer et al. | 717/140 |
| 2002/0178437 A1 * | 11/2002 | Blais et al. | 717/140 |
| 2003/0023956 A1 * | 1/2003 | Dulberg et al. | 717/130 |
| 2003/0056199 A1 * | 3/2003 | Li et al. | 717/127 |
| 2003/0056200 A1 * | 3/2003 | Li et al. | 717/128 |
| 2004/0162930 A1 * | 8/2004 | Forin et al. | 711/1 |
| 2006/0179427 A1 * | 8/2006 | Underseth et al. | 717/140 |

OTHER PUBLICATIONS

Improving memory utilization in cache coherence directories Lilja, D.J.; Yew, P.-C. vol. 4 Issue: 10 Oct. 1993 pp. 1130-1146, IEEE.*

Code optimization method for DSPs with multiple memory addressing registers and its application to compilers Sugino, N.; Yoshida, S.; Nishihara, A. vol. 2 Nov. 26-29, 1996 pp. 619-624, IEEE.*

Memory address allocation method for a indirect addressing DSP with consideration of modification in local computational order Sugino, N.; Funaki, H.; Nishihara, A. vol. 3 Jul. 1999 pp. 496-499, IEEE.*

Chase, David R., Mark Wegman, and F. Kenneth Zadeck. Analysis of Pointers and Structures, In Proceedings of the SIGPLAN 1990 Symposium on Programming Language Design and Implementation, White Plains, NY, published as SIGPLAN Notices, vol. 25, No. 6, pp. 296-310, Jun. 1990, as printed on Aug. 17, 2003.

J. Choi, M. Burke, and P. Carini. Efficient flow-sensitive interprocedural computation of pointer-induced aliases aliases and side-effects. In Conference Record of the 20th Annual ACM Sigplan-Sigact symposium on Principles of Programming Languages, pp. 232-245, Charleston, South Carolina, Jan. 1993.

* cited by examiner

METHODS AND APPARATUS FOR DETERMINING IF A USER-DEFINED SOFTWARE FUNCTION IS A MEMORY ALLOCATION FUNCTION DURING COMPILE-TIME

TECHNICAL FIELD

This specification relates in general to software compilers, and, in particular, to methods and apparatus for determining if a user-defined software function is a memory allocation function during compile-time.

BACKGROUND

Software programs typically include numerous "memory allocation" functions. A memory allocation function, such as the C "malloc" function, sets aside a portion of the computer's memory resources (i.e., a "memory object") for use by the associated software program.

Software compilers often attempt to disambiguate references to memory objects during compile time in order to produce more efficient object code. For pointers to static memory objects, the compile-time names of the memory objects may be used to abstract the target memory. However, dynamically allocated memory objects do not have compile-time names. Instead, the compiler may use the static allocation site of the memory object as a compile-tie name.

However, using this scheme, the compiler cannot disambiguate between objects associated with the same allocation site if a call is made to a standard memory allocation function within a user defined function (i.e., the compiler cannot tell the difference between two different memory objects produced by two different calls to the same user-defined function which allocates memory). As a result, memory objects produced by memory allocation functions which are included in a user-defined function are not distinguished during compile-time when more than one call to the user-defined function is made by the software. In other words, the compiler does not recognize the user-defined function as a memory allocation function, because the compiler does not know if the user-defined function returns a new memory object every time the user-defined function is invoked, and the compiler does not know if variables being assigned are available outside the scope of the user defined function (i.e., the address of the allocated memory object may or may not be stored in a variable or a data structure that is accessible by a function that is not within the user-defined function.)

DETAILED DESCRIPTION OF EXAMPLES

Figure 1:
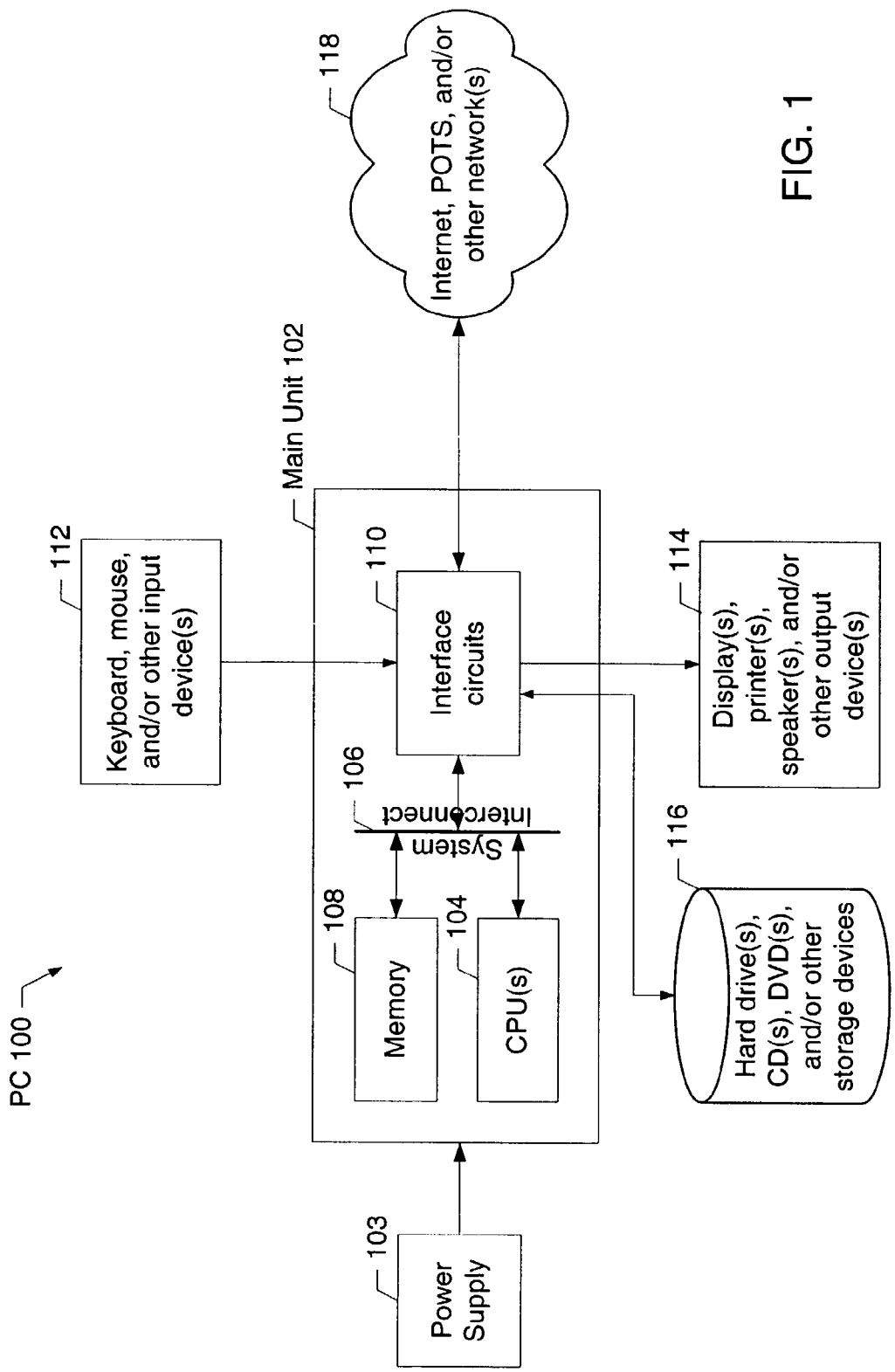
FIG. 1 is a block diagram of a computer system illustrating an environment of use for the disclosed methods and apparatus.

A block diagram of an example computer system 100 is illustrated in FIG. 1. The computer system 100 may be a personal computer (PC) or any other computing device capable of executing a software compiler program. In an example, the computer system 100 includes a main processing unit 102 powered by a power supply 103. The main processing unit 102 illustrated in FIG. 1 includes one or more central processing units (CPUs) 104 electrically coupled by a system interconnect 106 to one or more memory device(s) 108 and one or more interface circuits 110. In an example, the system interconnect 106 is an address/data bus. Of course, a person of ordinary skill in the art will readily appreciate that interconnects other than busses may be used to connect the CPU(s) 104 to the memory device(s) 108. For example, one or more dedicated lines and/or a crossbar may be used to connect the CPU(s) 104 to the memory device(s) 108.

The CPU(s) 104 may include any type of well known microprocessor, such as a microprocessor from the Intel Pentium™ family of microprocessors, the Intel Itanium™ family of microprocessors, and/or the Intel XScale™ family of processors. The main memory device 108 may include dynamic random access memory (DRAM), but may also include non-volatile memory. In an example, the memory device(s) 108 store a software program which is executed by one or more of the CPU(s) 104 in a well known manner.

The interface circuit(s) 110 may be implemented using any type of well known interface standard, such as an Ethernet interface and/or a Universal Serial Bus (USB) interface. In the illustrated example, one or more input devices 112 are connected to the interface circuits 110 for entering data and commands into the main processing unit 102. For example, an input device 112 may be a keyboard, mouse, touch screen, track pad, track ball, isopoint, and/or a voice recognition system.

In the illustrated example, one or more displays, printers, speakers, and/or other output devices 114 are also connected to the main processing unit 102 via one or more of the interface circuits 110. The display 114 may be a cathode ray tube (CRT), a liquid crystal display (LCD), or any other type of display. The display 114 may generate visual indications of data generated during operation of the main processing unit 102. For example, the visual indications may include prompts for human operator input, calculated values, detected data, etc.

The illustrated computer system 100 also includes one or more storage devices 116. For example, the computer system 100 may include one or more hard drives, a compact disk (CD) drive, a digital versatile disk drive (DVD), and/or other computer media input/output (I/O) devices.

The illustrated computer system 100 also exchanges data with other devices via a connection to a network 118. The network connection may be any type of network connection, such as an Ethernet connection, digital subscriber line (DSL), telephone line, coaxial cable, etc. The network 118 may be any type of network, such as the Internet, a telephone network, a cable network, and/or a wireless network.

Figure 2:
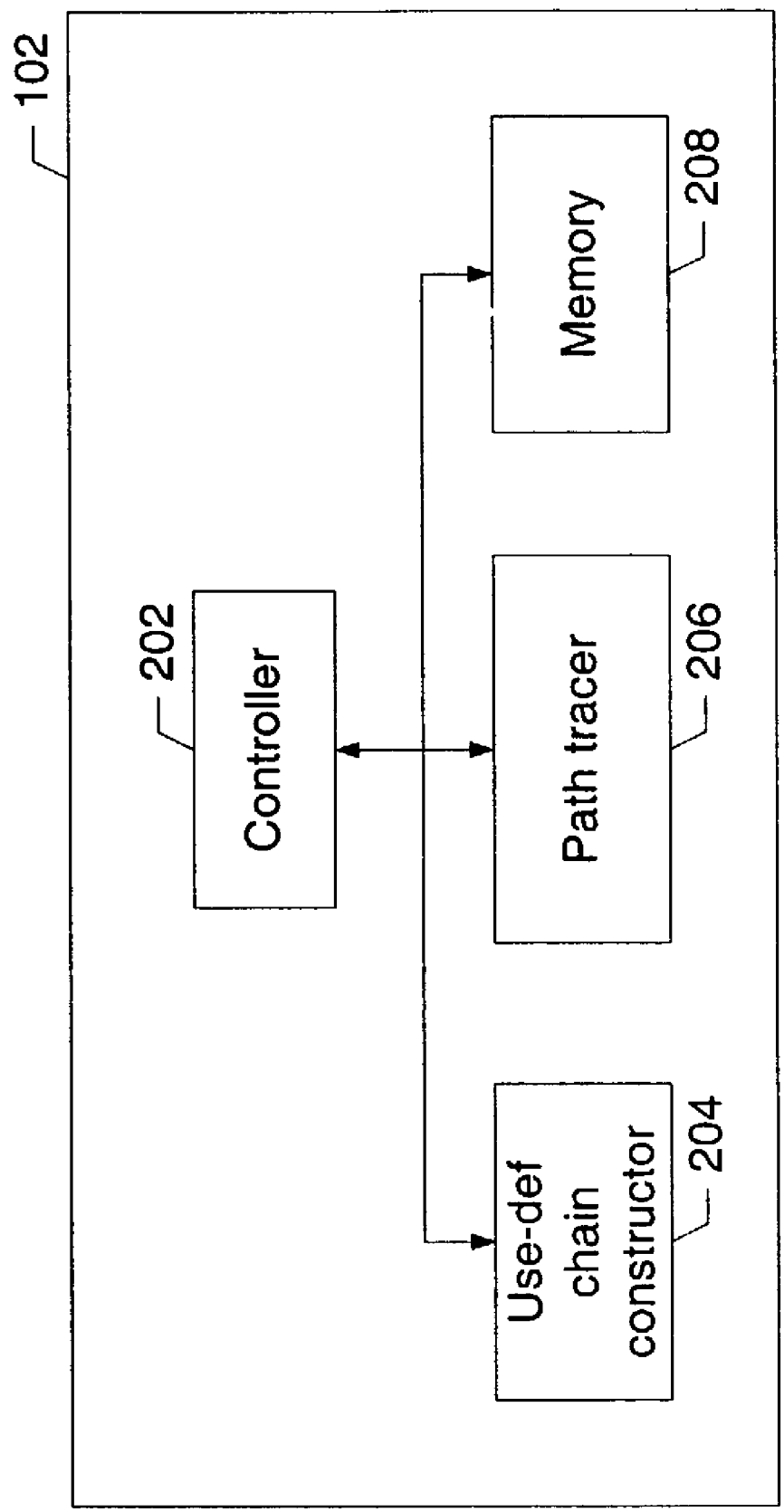
FIG. 2 is a block diagram of another example of the main processing unit.

Another example implementation of the main processing unit 102 is illustrated in FIG. 2. Preferably, the main processing unit 102 includes a controller 202, a 'use-def' chain constructor 204, a path tracer 206, and a memory device 208. The controller 202, the use-def chain constructor 204, and the path tracer 206 may be implemented by conventional electronic circuitry in a well known manner and/or by a microprocessor executing software instructions in a well known manner. The memory device 208 may be implemented by any type of memory device including, but not limited to, dynamic random access memory (DRAM), static random access memory (SRAM), and/or non-volatile memory. In addition, a person of ordinary skill in the art will readily appreciate that certain modules in the main processing unit 102 may be combined or divided according to customary design constraints. Still further, one or more of the modules may be located external to the main processing unit 102.

For the purpose of constructing a plurality of use-def chains for a user-defined software function, the main processing unit 102 includes a use-def chain constructor 204. Use-def chains are a standard data structure generated by many optimizing compilers in a well known manner. See, for example, Aho, Sethi, Ullman, Compilers. Principles, techniques, and Tools, Addison-Wesley, (1986). In one example, a Static Single Assignment (SSA) use-def chain is constructed.

For the purpose of tracing a path of one or more return statements within the user-defined function, the main processing unit 102 includes a path tracer 206. The path tracer 206 traces code paths by traversing the use-def chains in a well known manner. For example, a "return" statement may be traced back to a calling function. Of course, functions may be called multiple times from multiple locations in the software program, and functions may be nested within other functions. However, a person of ordinary skill in the art will readily appreciate that the 'return' paths of such functions may be traced using use-def chains in a well known manner.

For the purpose of storing data indicating that the user-defined software function is a memory allocation function or a non-memory allocation function, the main processing unit 102 includes a memory device 208. As stated above, the memory device 208 may be implemented by any type of memory device including, but not limited to, dynamic random access memory (DRAM), static random access memory (SRAM), and/or non-volatile memory.

For the purpose of controlling the interaction of the use-def chain constructor 204, the path tracer 206, and the memory device 208, the main processing unit 102 includes a controller 202. The controller 202 is operatively coupled to the use-def chain constructor 204, the path tracer 206, and the memory device 208 in a well known manner. For example, one set of software instructions may be operatively coupled to another set of software instructions via a subroutine call, parameter passing, and/or shared memory location(s). In another example, one piece of electronic circuitry may be operatively coupled to another piece of electronic circuitry via electrical signal line(s) such as a bus. In yet another example, a set of software instructions may be operatively coupled to a piece of electronic circuitry via electrical signal line(s) stimulated by a microprocessor executing the software instructions. In one example, the controller 202, the use-def chain constructor 204, and the path tracer 206 are implemented by the CPU 104 executing software instructions.

In an example, the controller 202 is structured to cause the use-def chain constructor 204 to construct a plurality of use-def chains for the user-defined software function. For example, the use-def chain constructor 204 may construct an SSA representation. In addition, the controller 202 preferably causes the path tracer 206 to trace a path of a return statement within the user-defined function using at least one of the use-def chains. Subsequently, the controller 202 may denote the user-defined software function as a non-memory allocation function if a path of the return statement does not terminate at a call to a known memory allocation function on the right hand side of an assignment operator. Preferably, the controller 202 is structured to recognize at least one of a "malloc" function, a "calloc" function, a "new" function, a standard C library function, a standard C++ library function, and/or any programming language function which allocates memory as known memory allocation functions.

Further, the controller 202 preferably causes the path tracer 206 to trace at least one use-def chain of a variable on the left hand side of the assignment operator if the path of the at least one return statement does terminate at the call to one of the known memory allocation functions on the right hand side of the assignment operator. Subsequently, the controller 202 may denote the user-defined software function as a non-memory allocation function if the variable on the left hand side of the assignment operator is available outside the scope of the user-defined function. If the controller 202 does not denote the user-defined software function as a non-memory allocation function according to either of the above criteria, the controller 202 preferably denotes the user-defined software function as a memory allocation.

Figure 3:
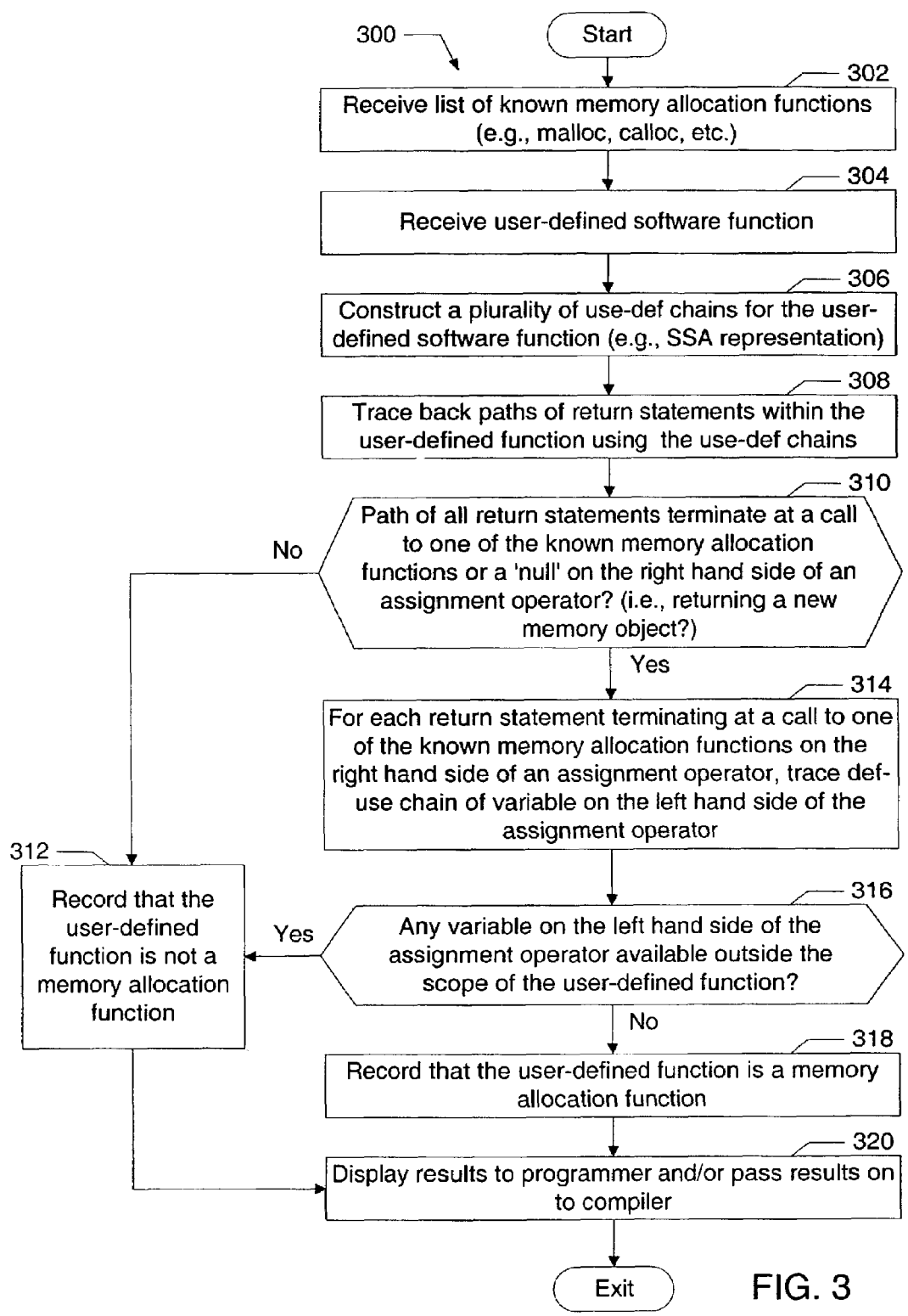
FIG. 3 is a flowchart of a process for determining if a user-defined software function is a memory allocation function during compile-time.

A flowchart of a process 300 for determining if a user-defined software function is a memory allocation function during compile-time is illustrated in FIG. 3. Preferably, the process 300 is embodied in a software program which is stored in the memory 108 and executed by the CPU 104 in a well known manner. However, some or all of the components of the process 300 may be performed by another device. Although the process 300 is described with reference to the flowchart illustrated in FIG. 3, a person of ordinary skill in the art will readily appreciate that many other methods of performing the acts associated with process 300 may be used. For example, the order of many of the blocks may be changed, and some of the blocks described are optional.

Generally, the process 300 causes the CPU 104 to determine if a user-defined software function returns a new memory object every time the user-defined function is invoked, and determine if the memory objects created by the user-defined function are available outside the scope of the user defined function. If the user-defined function returns a new memory object every time the user-defined function is invoked, and the memory objects created by the user-defined function are not available outside the scope of the user defined function, then the user-defined function is determined to be a memory allocation function. Otherwise, the user-defined function is determined to be a non-memory allocation function.

In the example illustrated in FIG. 3, the process 300 begins by receiving a list of known memory allocation functions at the computer system 100 (block 302). For example, "malloc" and "calloc" are well known memory allocation functions in the standard C programming library. Similarly, "new" is a well known memory allocation function in the standard C++ programming library. In addition, the computer system 100 receives at least one user-defined software function to be tested (block 304). Subsequently, the process 300 causes the computer system 100 to construct a plurality of use-def chains for the user-defined software function (block 306). For example, a software compiler may construct the Static Single Assignment (SSA) representation in a well known manner. Using the constructed use-def chains, the computer system 100 then traces back paths of "return" statements within the user-defined function (block 308).

If none of the return paths terminates on the right hand side of an assignment operator with a call to one of the known memory allocation functions (block 310), the computer system 100 preferably records in memory 108 and/or device 116 that the user-defined function is not a memory allocation function (block 312). If the path of all return statements terminate at a call to one of the known memory allocation functions or a "null" on the right hand side of an assignment operator (block 310), the computer system 100 preferably traces the def-use chain of the variable on the left hand side of the assignment operator for each such return statement (block 314).

If any such variable on the left hand side of the assignment operator is available outside the scope of the user-defined function (block 316), the computer system 100 preferably records in memory 108 and/or device 116 that the user-defined function is not a memory allocation function (block 312). If no such variable on the left hand side of the assignment operator is available outside the scope of the user-defined function (block 316), the computer system 100 preferably records in memory 108 and/or device 116 that the user-defined function is a memory allocation function (block 318).

Once the computer system 100 determines if the user-defined function is a memory allocation function or a non-memory allocation function, the computer system 100 may communicate the results to a programmer on a user output device 114 and/or pass the results on to an additional compiler sub-system.

In summary, persons of ordinary skill in the art will readily appreciate that methods and apparatus for determining if a user-defined software function is a memory allocation function during compile-time have been provided. Systems implementing the teachings described herein may benefit from more efficient object code.

The foregoing description has been presented for the purposes of illustration and description. It is not intended to be exhaustive or to limit the this patent to the examples disclosed. Many modifications and variations are possible in light of the above teachings. It is intended that the scope of the this patent be limited not by this detailed description of examples, but rather by the claims appended hereto as properly construed under the law.

What is claimed is:

1. An apparatus structured to determine if a user-defined software function is a memory allocation function, the apparatus comprising:
   a use-def chain constructor structured to construct a plurality of use-def chains for the user-defined software function;
   a path tracer structured to trace a path of a return statement within the user-defined function using at least one of the use-def chains; and
   a controller operatively coupled to the use-def chain constructor and the path tracer, the controller being structured to:
   denote during a compile-time that the user-defined software function is a non-memory allocation function if a path of the return statement does not terminate at a call to a known memory allocation function on a right hand side of an assignment operator;
   trace at least one use-def chain of a variable on a left hand side of the assignment operator if the path of the return statement does terminate at the call to the known memory allocation function on the right hand side of the assignment operator; and
   denote during the compile-time that the user-defined software function is a non-memory allocation function if a variable on a left hand side of the assignment operator is available outside a scope of the user-defined function.

2. An apparatus as defined in claim 1, wherein the controller is further structured to denote during the compile-time that the user-defined software function is a memory allocation function if the user-defined software function is not denoted as a non-memory allocation function.

3. An apparatus as defined in claim 1, wherein the path tracer is further structured to trace at least one use-def chain of a variable on the left hand side of the assignment operator if the path of the at least one return statement does terminate at the call to one of the known memory allocation functions on the right hand side of the assignment operator.

4. An apparatus as defined in claim 1, wherein the controller is further structured to recognize at least one of a malloc function, a calloc function, and a new function as the known memory allocation function.

5. An apparatus as defined in claim 1, wherein the controller is further structured to recognize at least one of a standard C library function and a standard C++library function as the known memory allocation function.

6. An apparatus as defined in claim 1, wherein the use-def chain constructor is further structured to construct a Static Single Assignment (SSA) representation as at least one of the plurality of use-def chains.

7. An apparatus as defined in claim 1, further comprising a memory device operatively coupled to the controller, the memory device storing data indicating that the user-defined software function is a non-memory allocation function.

8. An apparatus as defined in claim 1, further comprising a memory device operatively coupled to the controller, the memory device storing data indicating that the user-defined software function is a memory allocation function.

9. A method of determining if a user-defined software function is a memory allocation function during a compile-time, the method comprising:
   providing a list of known memory allocation functions;
   constructing via a machine a plurality of use-def chains for the user-defined software function;
   tracing a path of at least one return statement within the user-defined function using at least one of the use-def chains;
   denoting during the compile-time that the user-defined software function is a non-memory allocation function if the path of the at least one return statement does not terminate at a call, to one of the known memory allocation functions on a right hand side of an assignment operator;
   tracing at least one use-def chain of a variable on a left hand side of the assignment operator if the path of the at least one return statement does terminate at the call to one of the known memory allocation functions on the right hand side of the assignment operator;
   denoting during the compile-time that the user-defined software function is a non-memory allocation function if the variable on the left hand side of the assignment operator is available outside a scope of the user-defined function; and
   denoting during the compile-time that the user-defined software function is a memory allocation function if the user-defined software function is not denoted as a non-memory allocation function.

10. A method as defined in claim 9, wherein providing a list of known memory allocation functions comprises providing a list of known memory allocation functions that includes a 'malloc' function.

11. A method as defined in claim 9, wherein providing a list of known memory allocation functions comprises providing a list of known memory allocation functions that includes a 'calloc' function.

12. A method as defined in claim 9, wherein providing a list of known memory allocation functions comprises providing a list of known memory allocation functions that includes a 'new' function.

13. A method as defined in claim 9, wherein providing a list of known memory allocation functions comprises providing a list of known memory allocation functions that includes a plurality of standard C library functions.

14. A method as defined in claim 9, wherein providing a list of known memory allocation functions comprises providing a list of known memory allocation functions that includes a plurality of standard C++ library functions.

15. A method as defined in claim 9, wherein constructing a plurality of use-def chains for the user-defined software function comprises building a Static Single Assignment (SSA) representation of the user-defined function.

16. An apparatus structured to determine if a user-defined software function is a memory allocation function during a compile-time, the apparatus comprising:
- a data input device;
- a user output device;
- a memory device storing a compiler software program and a target software program, the target software program including the user-defined software function; and
- a processor operatively coupled to the data input device, the user output device, and the memory device, the processor being structured to store the target software program received at the data input device on the memory device, the processor being structured to execute the compiler software program, the compiler software program being structured to cause the processor to:
    construct a plurality of use-def chains for the user-defined software function;
    trace a path of at least one return statement within the user-defined function using at least one of the use-def chains;
    denote during the compile-time that the user-defined software function is a non-memory allocation function if the path of the at least one return statement does not terminate at a call to a known memory allocation function on a right hand side of an assignment operator;
    trace at least one use-def chain of a variable on a left hand side of the assignment operator if the path of the at least one return statement does terminate at the call to the known memory allocation function on the right hand side of the assignment operator;
    denote during the compile-time that the user-defined software function is a non-memory allocation function if the variable on the left hand side of the assignment operator is available outside a scope of the user-defined function;
    denote during the compile-time that the user-defined software function is a memory allocation function if the user-defined software function is not denoted as a non-memory allocation function; and
    generate an indicator of the denotation of the user-defined software function on the user output device.

17. An apparatus as defined in claim 16, wherein the compiler software program is structured to cause the processor to recognize at least one of a 'malloc' function, a 'calloc' function and a 'new' function as the known memory allocation function.

18. An apparatus as defined in claim 16, wherein the compiler software program is structured to cause the processor to recognize a standard C library function as the known memory allocation function.

19. An apparatus as defined in claim 16, wherein the compiler software program is structured to cause the processor to recognize a standard C++ library function as the known memory allocation function.

20. An apparatus as defined in claim 16, wherein the compiler software program is structured to cause the processor to construct a Static Single Assignment (SSA) representation as at least one of the plurality of use-def chains.

21. A computer readable medium storing a software program, the software program being structured to cause a processor to:
- construct a plurality of use-def chains for the user-defined software function;
- trace a path of at least one return statement within the user-defined function using at least one of the use-def chains;
- denote during a compile-time that the user-defined software function is a non-memory allocation function if the path of the at least one return statement does not terminate at a call to a known memory allocation function on a right hand side of an assignment operator;
- trace at least one use-def chain of a variable on a left hand side of the assignment operator if the path of the at least one return statement does terminate at the call to the known memory allocation function on the right hand side of the assignment operator;
- denote during the compile-time that the user-defined software function is a non-memory allocation function if the variable on the left hand side of the assignment operator is available outside a scope of the user-defined function; and
- denote during the compile-time that the user-defined software function is a memory allocation function if the user-defined software function is not denoted as a non-memory allocation function.

22. A computer readable medium as defined in claim 21, wherein the software program is structured to cause the processor to recognize at least one of a C 'malloc' Function, a C 'calloc' function, and a C++ 'new' function as the known memory allocation function.

23. A computer readable medium as defined in claim 21, wherein the software program is structured to cause the processor to recognize at least one of a standard C library function and a standard C++ library function as the known memory allocation function.

24. A computer readable medium as defined in claim 21, wherein the software program is structured to cause the processor to construct a Static Single Assignment (SSA) representation as at least one of the plurality of use-def chains.

* * * * *